United States Patent [19]

Chang et al.

[11] 4,157,359

[45] Jun. 5, 1979

[54] POLYURETHANES STABILIZED AGAINST ULTRAVIOLET LIGHT AND NITROGEN OXIDE DETERIORATION

[75] Inventors: Eugene Y. C. Chang; Samuel Kaizerman, both of Somerville, N.J.

[73] Assignee: American Cyanamid Co., Stamford, Conn.

[21] Appl. No.: 690,127

[22] Filed: May 26, 1976

Related U.S. Application Data

[63] Continuation of Ser. No. 567,568, Apr. 14, 1975, abandoned, which is a continuation of Ser. No. 371,815, Jun. 20, 1973, abandoned.

[51] Int. Cl.² .............................................. C08L 61/20
[52] U.S. Cl. .......................... 260/849; 260/45.8 NT; 260/45.85 V; 260/45.95 F; 260/45.95 HR; 260/850

[58] Field of Search ............... 260/849, 850, 45.8 NT, 260/45.85 V, 45.95 B, 45.95 F, 45.95 H, 45.95

[56] References Cited

U.S. PATENT DOCUMENTS

| 2,984,645 | 5/1961 | Hoeschele | 260/45.85 N |
|---|---|---|---|
| 3,379,675 | 4/1968 | Jensel et al. | 260/45.95 B |
| 3,384,606 | 5/1968 | Dieterich et al. | 260/84.9 |
| 3,536,663 | 10/1970 | Oertel et al. | 260/45.95 B |
| 3,706,701 | 12/1972 | Susi | 260/45.95 R |

*Primary Examiner*—J. Ziegler
*Attorney, Agent, or Firm*—Frank M. Van Riet

[57] ABSTRACT

A polyurethane polymer stabilized against the deteriorative effects of ultraviolet light and nitrogen oxides is provided comprising the polymer combined with a stabilizing amount of an aminoplast resin.

12 Claims, No Drawings

POLYURETHANES STABILIZED AGAINST ULTRAVIOLET LIGHT AND NITROGEN OXIDE DETERIORATION

This application is a continuation of our abandoned application Ser. No. 567,568, filed Apr. 14, 1975, which, in turn, is a continuation of our abandoned application Ser. No. 371,815, filed June 20, 1973.

Generally stated, the subject matter of the present invention relates to stabilized polyurethanes. More particularly, the invention relates to polyurethanes stabilized against the degradative effects a composition comprising ultrviolet light and nitrogen oxides an ultraviolet light absorber and an antioxidant.

BACKGROUND OF THE INVENTION

Polyurethanes are subject to deterioration when exposed to ultraviolet light or nitorgen oxide fumes. This deterioration is manifested by a discoloration of the polyurethane, usually yellow to brown. It is particularly apparent in films prepared from polyether based polyurethanes chain extended with water. This discoloration is also noticed in polyurethanes prepared from polyesters, as well as in shaped articles such as fibers.

The discoloration due to ultraviolet light can be reduced by the addition to the polyurethane of an ultraviolet absorber; however, the ultraviolet absorber has little or no effect in protecting the polymer against nitrogen oxide fumes. The addition of a commonly used hindered phenol antioxidant will serve to reduce the deterioration due to nitrogen oxide fumes; however, there is little to no effect in reducing ultraviolet light degradation. Combinations of ultraviolet absorber and antioxidant can and have been used successfully. Note U.S. Pat. No. 3,379,675, Jensen et al, wherein a combination of 2,2'-(o-hydroxyphenyl)benzotriazole and 1,3,5-trimethyl-2,4,6-tris(3,5-di-t-butyl-4-hydroxybenzyl)benzene is added to a polyether based spandex fiber. The combination is reported to produce a synergistic effect which is greater than that expected from the simple additive effects of the two types of stabilizers used separately. The above phenolic compound and 1,2,4,5-tetramethyl-3,6-bis(3,5-di-t-butyl-4-hydroxybenzyl)benzene are reported to stabilize polyether based spandex fibers against deterioration due to acid fumes; see U.S. Pat. No. 3,395,114, Smith.

The present invention represents the culmination of a long series of investigations conducted largely by the inventors directed to overcoming the inherent problems of ultraviolet light and nitrogen oxide degradation of polyurethane polymers.

Accordingly, it is the primary object of the present invention to provide a polyurethane polymer stabilized against the degradative effects of ultraviolet light and nitrogen oxide fumes.

Another object of the invention is to provide a process for avoiding the deterioration of polyurethane polymers.

Generally then, it is an object of this invention to provide polyurethane polymers which are stable against the deterioration of ultraviolet light and nitrogen oxide fumes.

Additional objects and advantages of the invention will be set forth in part in the description which follows and in part will be obvious from the description, or may be realized by practice of the invention, the objects and advantages being realized abd attained by means of the methods, processes, instrumentalities and combinations particularly pointed out in the appended claims.

THE INVENTION

To achieve the foregoing objects and in accordance with its purpose as embodied and broadly described, the present invention relates to a polyurethane stabilized against the deteriorative effects of ultraviolet light and nitrogen oxides, which comprises a stabilizing amount of a composition comprising an aminoplast resin, an ultraviolet light absorber and an antioxidant said polyurethane being the reaction product of a polyether, a polyester or a polyformal polyol, an aromatic diisocyanate, and, a low molecular weight compound containing at least two active hydrogen atoms which display activity according to the Zerewitinoff test.

In addition, the invention also relates to a process for stabilizing polyurethanes, from deterioration due to nitrogen oxides and ultraviolet light, which comprises adding a stabilizing amount of an aminoplast resin.

It is to be understood that both the foregoing general description and the following detailed description are exemplary and explanatory and are not restrictive of the invention.

The present invention is based on the discovery that polyurethane shaped articles, especially water-extended polyether-based films, are stabilized against both ultraviolet light and nitrogen oxide fumes with a high degree of effectiveness by the addition thereto of an aminoplast resin.

The present invention differs from the prior art methods in the use of an aminoplast resin to improve the color of polyurethanes on exposure to ultraviolet light and nitrogen oxide fumes. It has advantages over known methods of stabilization in that the aminoplast resins additionally improve the effectiveness of either the ultraviolet absorber or antioxidant or both in combination. The highest overall effectiveness is obtained with a combination of an aminoplast resin, ultraviolet absorber and antioxidant.

The polyurethanes stabilized according to the present invention can be either polyether- polyester- or polyformal-based and be in the form of shaped articles such as films, fibers, compression molded or cast articles, coatings, extruded or injection molded articles, and the like. The beneficial effects of the invention, however, are most apparent in films, which includes coatings, produced from polyether-based polyurethanes chain-extended with water.

The polyethers used in the preparation of the polyurethanes of this invention derive from lower alkylene oxides and have molecular weights in the range of from about 500 to 5,000, preferably 1,000 to 3,000. Typical of the polyethers are polyethylene ether glycol, polypropylene ether glycol, and polytetramethylene ether glycol, particularly the latter.

The polyformals are derived from the condensation reaction of an α,ω-glycol and formaldehyde under acidic catalysis. The polyformals are hydroxyl terminated and have a molecular weight in the range of about 500 to 5,000, preferably 1,000 to 3,000. Typical polyformals are poly-1,6-hexane formal, poly-1,5-pentane formal and the polyformals from thiodiethanol and diethylene glycol among others. Poly-1,6-hexane formal is preferred.

The polyesters are prepared according to well known methods by the condensation of an aliphatic glycol, such as ethylene glycol, propylene glycol, 1,4-butandiol, hexamethylene glycol, and the like, with an aliphatic dicarboxylic acid or anhydride, such as succinic acid (or anhydride), adipic acid, pimelic acid, sebacic acid, suberic acid, and the like. They are hydroxyl terminated and have molecular weights in the range of from about 500 to 5,000. Mixtures of polyesters and polyethers may also be used.

The hydroxyl terminated polyethers, polyesters or polyformals are reacted with an aromatic diisocyanate and, optionally, a low molecular weight compound containing at least two active hydrogen atoms which display activity according to the Zerewitinoff test, by well-known procedures. Thus, the polymeric diol may be reacted initially with an excess of an aromatic diisocyanate to form a prepolymer, which is then chain extended with said low molecular weight compound, or the reactants, including the low molecular weight compound, may be combined and reacted together at one time. In any case, regardless of the methods employed to prepare the polyurethane, the present invention is beneficial in reducing the deterioration of the polymer caused by ultraviolet light and nitrogen oxide fumes.

Suitable aromatic diisocyanates include 2,4-tolylene diisocyanate, 2,6-tolylene diisocyanate (and mixtures of the two isomers), p-phenylene diisocyanate 4,4'-biphenylene diisocyanate, methylenebis (phenylisocyanate) and the like. The diisocyanate is not critical to the invention.

In the preparation of the polyurethanes it is sometimes desirable to incorporate a small amount of a triol, in addition to the polyol to reduce the ultimate elongation to a lower level if desired. A suitable triol is trimethylol propane.

In a preferred embodiment of the invention, wherein the prepolymer is chain-extended with water, it is desirable to incorporate into the prepolymer an emulsifiable group, e.g. a carboxyl group. This may be introduced into the prepolymer by including in the total polyol content a compound such as dihydroxymethyl propionic acid. The compound is incorporated into the prepolymer by virtue of the hydroxyl groups and the resulting prepolymer will contain pendant carboxyl groups. However, emulsifiable groups can be introduced into the prepolymer by any known means, such as described e.g., in British Pat. No. 1,078,202. When such a prepolymer is contacted with water containing a salt forming compound, e.g. triethylamine, the polymer is immediately emulsified. Thus, the chain-extended polymer is ready for use in film-forming as a stable latex. A latex may also be formed by contacting the prepolymer with water containing an emulsifying agent.

As herein employed the term aminoplast resins shall be defined as the reaction products of either urea or an aminotriazine compound such as melamine, with an aldehyde; usually formaldehyde, and optionally an alcohol such as methyl, butyl or isobutyl alcohol. The aminoplast resins are commonly used in the textile finishing industry to provide durable press or wrinkle resistant fabrics, as a result of reaction with the substrate and conversion to the thermoset state. This group of compounds include the urea-formaldehydes, e.g. dimethylol urea formaldehyde, propylene urea formaldehyde, etc.; melamine formaldehydes, e.g. trimethylol melamines, tetramethylolmelamines, pentamethylol melamines, etc., including methylated methylol melamines; ethylene ureas, e.g. dimethylol ethylene urea, dihydroxy dimethylol ethylene urea, etc.; triazones, e.g. dimethylol-N-ethyl triazone, N,N'-ethylenebisdimethylol triazone, etc.; urons, e.g. dihydroxy dimethylol uron, and the like. Mixtures of the above are also contemplated. The mode of action of the aminoplast resins in the present invention is not analogous to their use in textile finishing applications. It is not known how these aminoplast resins function to stabilize the polyurethanes of this invention against ultraviolet light and nitrogen oxide fumes, nor is it known how these compounds co-react with added ultraviolet light and/or antioxidants to provide additional stability to the polyurethanes.

The ultraviolet absorbers which may be used in combination with the aminoplasts and phenolic antioxidants include:

A. 2-Hydroxybenzophenones: especially 2-hydroxybenzophenones with at least one additional substituent, for example 2-hydroxy-4-methoxybenzophenone 2,4-dihydroxybenzophenone, 2,2'-dihydroxy-4-methoxybenzophenone, 2,2',4,4'-tetrahydroxybenzophenone, 2,2'-dihydroxy-4,4'-dimethoxybenzophenone, 2-hydroxy-4-butoxybenzophenone, 2-hydroxy-4-octyloxybenzophenone, 2-hydroxy-4-dodecyloxybenzophenone, and the like. This type of ultraviolet absorber is described in U.S. Pat. Nos. 2,777,838 issued Jan. 15, 1967; 2,682,559 issued June 29, 1954; 2,693,492 issued Nov. 2, 1954; 2,861,053 issued Nov. 18, 1958; 2,919,259 issued Dec. 29, 1959; 2,967,259 issued Mar. 21, 1961; 3,006,959 issued Oct. 31, 1961; and 3,098,842 issued July 23, 1963.

B. Benzotriazoles: especially the 2-(2-hydroxyphenyl)-benzotriazoles such as 2-(2-hydroxy-5-methylphenyl)benzotriazole, 2-(2-hydroxy-5-octylphenyl)benzotriazole, 2-(2-hydroxy-4-methoxyphenyl)benzotriazole, 2-(2-hydroxy-3-t-butyl-5-methylphenyl)benzotriazole, 2-(2-hydroxy-3,5-di-t-butylphenyl)benzotriazole, 2-(2-hydroxy-3,5-di-t-amylphenyl)benzotriazole, 2-(2-hydroxy-3,5-di-t-butyl-phenyl)-5-chlorobenzotriazole, 2-(2-hydroxy-3-t-butyl-5-methylphenyl)-5-chlorobenzotriazole, and the like. This class of ultraviolet absorber is described in U.S. Pat. Nos. 3,004,896 issued Oct. 17, 1961; 3,018,269 issued Jan. 23, 1962; 3,271,339 issued Sept. 6, 1966.

C. Benzylidene-malonic esters: Diethyl-p-methoxybenzylidenemalonate, diethyl o-methoxybenzylidenemalonate, diethyl p-hydroxybenzylidenemalonate, diethyl diphenylmethylenemalonate, and the like. This class of ultraviolet absorbers is disclosed in application Ser. No. 389,210, filed Aug. 12, 1964. Additional ultraviolet absorbers of the class are also disclosed in U.S. Pat. No. 3,244,668 issued Apr. 15, 1966.

The phenolic antioxidants useful in combinations of this invention include: 2,6-di-t-butylphenol, 2,6-di-t-butyl-p-cresol, 2,2'methylenebis(4-methyl-6-t-butylphenol), 2,2'-methylenebis-(4-ethyl-6-t-butylphenol), 4,4'-butylidenebis(6-t-butyl-m-cresol), 4,4'-methylenebis(2,6-di-t-butylphenol), 4,4'-thiobis(6-t-butyl-o-cresol, 4,4'-thiobis(6-t-butyl-m-cresol), styrenated phenols and styrenated cresols, such as Wingstay S, and the like.

The aminoplast resin may be incorporated into the polymer in a number of ways. The preferred method is to add them to the emulsion since they are usually water soluble. The ultraviolet absorbers and/or antioxidants are preferably added to the prepolymer before the emulsion is made. The aminoplast resin is added in an amount of from about 0.1 to 5 percent, based on the weight of the polymer, preferably from about 0.5 to 2 percent. When used, the ultraviolet absorber or antioxidants are used in an amount of from about 0.1 to 5 percent, based on the weight of polymer.

The following is illustrative of the effectiveness of the invention: The latex is cast into 15–20 mil films on glass plates and dried. The films are then tested according to Standard Test Method AATCC 16A-1964, Colorfastness to Light:Carbon-Arc Lamp, Continuous Light, using a Fade-Ometer; time of exposure 80 hours. The films are also exposed to nitrogen oxide fumes according to Standard Test Method AATCC 23-1962, Colorfastness to Oxides of Nitrogen in the Atmosphere, time of exposure 32 hours. The yellowness or Yellow Index of the samples after exposure is determined using ASTM D-1925 with Hunterlab Model D25 Color and Color Difference Meter.

The following examples are provided for illustrative purposes and may include particular features of the invention. However, the examples should not be construed as limiting the invention, many variations of which are possible without departing from the spirit or scope thereof.

EXAMPLE I

Preparation of Polyurethane Prepolymer

Polypropylene glycol, having a molecular weight of 2025, 2025 grams, 1 mole, trimethylolpropane, 26.8 grams, 0.2 mole, dihydroxymethylpropionic acid, 65 grams, 0.48 mole, were reacted with 497 grams, 2.86 moles, of 80/20-tolylene diisocyanate for 18 hours at 70° C. The resulting polyurethane prepolymer containing pendant carboxyl groups had an NCO content of 4.05 percent.

EXAMPLE II

Preparation of Polyurethane Latex

A 100 gram sample of the prepolymer of Example I was poured into a high speed mixer, Waring Blendor, containing 150 ml. water and 2.8 ml. of triethylamine. The resulting emulsion, having a solids content of about 40 percent, was then transferred to a mechanically stirred vessel and the reaction continued for 16 hours at 22° C. to complete the water extension reaction.

The emulsion is then poured into a form on a glass plate. After drying a colorless rubbery film of about 15–20 mils in thickness is obtained. The films so obtained are exposed for 80 hours in the above described Fade-Ometer test and for 32 hours in the acid fume test. The yellowness resulting from these tests is measured using the Hunterlab Color and Color Difference Meter as described. The Yellow Index, YI is calculated according to the formula:

$$YI = 70(1 - \frac{blue}{green}), \text{ or}$$

$=70(1-R_{455}R_{577})$, where $R_{455}$ and $R_{557}$ represent the percentage reflectance at 455 and 557 millimicrons, respectively. Test results are shown in Table 1.

EXAMPLE III

A 120 gram sample of the prepolymer of Example II was mixed with 0.6 grams of 2-(2-hydroxy-3,5-di-t-butylphenyl)-5-chlorobenzotriazole by heating for 30 minutes at 70° C. An emulsion was prepared by pouring 100 grams of the above mixture into 150 ml. of water containing 2.8 ml. of triethylamine using a high speed mixer. The resulting emulsion was cast into a film and tested as described above. Test results are shown in Table 1.

EXAMPLE IV

An emulsion was prepared as in Example III, containing about 40 percent solids. 100 grams of the emulsion was mixed with 1.2 grams (containing 0.6 grams of solids) of dimethylol ethylene urea. The emulsion containing the stabilizer was stable for more than 4 months. The resulting emulsion was cast into a film and tested as described. Results are shown in Table 1.

EXAMPLES V–XIII

Following the procedures described above a number of aminoplast resin compounds were tested for their stabilizing ability in polyurethane. Pertinent data are shown in Table 1. The following stabilizers were employed and for the sake of brevity they were provided with alphabetical designations:

A = 2-(2-hydroxy-3,5-di-t-butylphenyl)-5-chlorobenzotriazole
B = dimethylol ethylene urea
C = slightly polymerized, methylated trimethylol melamine
D = highly methylated methylol urea
E = N,N'-bis(methoxymethyl)uron
F = 85 percent E + 15 percent hexa(methoxymethyl)melamine
G = methoxymethyl melamine containing an average of 5-5.5 methylol groups and 3.4 methyl groups
H = 70/30 mixture of N,N'-bis(methoxymethyl)uron + G
J = 60/40 mixture of 1.3-dimethylol-5-(β-hydroxyethyl)tetrahydrotriazone and polymethylolurea containing an average of 3.2 methylol groups
K = uron
L = 4,4'-butylidenebis(6-t-butyl-m-cresol)
M = 2,6-di-t-butyl-4-methylphenol
N = 2,2'-dihydroxy-4-methoxybenzophenone
P = 2-(2-hydroxy-5-octylphenyl)benzotriazole Table 1

| | | | Yellow Index | |
| --- | --- | --- | --- | --- |
| Example | Stabilizer | % | Fade-Ometer 80 hours | Acid Fumes 32 hours |
| II | — | — | 36 | 27 |
| III | A | 0.5 | 13.6 | 29.4 |
| IV | A | 0.5 | 10.4 | 12 |
| | B | 1.5 | | |
| V | B | 0.5 | 34.1 | 13.1 |
| | | 1.5 | 31.6 | 8.0 |
| | | 3.0 | 27.5 | 6.5 |
| VI | C | 1.5 | 28.6 | 8.9 |
| VII | D | 1.5 | 20 | 9 |
| VIII | E | 1.5 | 23 | 21.5 |
| IX | F | 1.5 | 28.7 | 22.5 |
| X | G | 1.5 | 35.4 | 17.3 |
| XI | H | 1.5 | 31.5 | 17.3 |
| XII | J | 1.5 | 36.0 | 14.6 |
| XIII | K | 1.5 | 31.4 | 22 |

The data show the improvement in the stability of the polyurethane films containing the aminoplast resin compounds and the added improvement which is afforded by the combination of aminoplast plus UV absorber. It will be noted that not all of the aminoplasts afford the high level of stability as (D). It will also be noted that the effect is concentration dependent to some degree. Another UV absorber alone does not provide protection against acid fume as shown in Example III. Table 2 shows the improvement obtained by the combination of aminoplast resins with UV absorber and/or antioxidant.

EXAMPLES XIV-XXXIII

The data shown in Table 2 were obtained from films prepared in the manner described above.

Table 2

| Example | Stabilizer | % | Yellow Index Fade-Ometer 80 hours | Acid Fumes 32 hours |
|---------|------------|-----|------|------|
| XIV | A | 0.5 | 10.1 | 14.5 |
|  | C | 1.5 |  |  |
| XV | A | 0.5 | 11.3 | 11.2 |
|  | D | 1.5 |  |  |
| XVI | A | 0.5 | 13.5 | 23.2 |
|  | L | 0.5 |  |  |
| XVII | A | 0.5 | 10.0 | 10.7 |
|  | B | 1.5 |  |  |
|  | L | 0.5 |  |  |
| XVIII | A | 0.5 | 13.6 | 24.5 |
|  | M | 0.5 |  |  |
| XIX | A | 0.5 | 10.4 | 11.7 |
|  | B | 1.5 |  |  |
|  | M | 0.5 |  |  |
| XX | N | 0.5 | 22.3 | — |
|  | M | 0.1 |  |  |
| XXI | M | 0.1 | 15.4 | 14.4 |
|  | N | 0.5 |  |  |
|  | B | 1.5 |  |  |
| XXII | P | 0.5 | 24.5 | 38.4 |
|  | M | 0.1 |  |  |
| XXIII | P | 0.5 | 14.1 | 13.8 |
|  | M | 0.1 |  |  |
|  | B | 1.5 |  |  |

We claim:

1. A composition stabilized against the deteriorative effects of ultraviolet light and nitrogen oxides which comprises a polyurethane containing a stabilizing amount of a composition comprising (1) an aminoplast resin, (2) an ultraviolet light absorber comprising a 2-hydroxybenzophenone, a benzotriazole or a benzylidene-malonic ester and (3) a phenolic antioxidant, said polyurethane being the reaction product of a polyurethane prepolymer prepared by reacting a polyether, a polyester of a polyformal polyol with an aromatic diisocyanate and reacting the isocyanate terminated prepolymer thus formed with a low molecular weight compound containing two active hydrogen atoms which display activity according to the Zerewitinoff test.

2. The polyurethane according to claim 1 wherein the low molecular weight compound is water.

3. The polymer according to claim 1 wherein the isocyanate is tolylene diisocyanate.

4. The polymer according to claim 1 wherein the polyol is a polyester.

5. The polyurethane according to claim 1 wherein the aminoplast resin is highly methylated methylol urea.

6. A composition according to claim 1 wherein said (1) is dimethyol ethylene urea, said (2) is 2-(2-hydroxy-3,5-di-t-butylphenyl)-5-chlorobenzotriazole and said (3) is 4,4'-butylidenebis(6-t-butyl-m-cresol).

7. A composition according to claim 6 wherein (3) is 2,6-di-t-butyl-4-methylphenol.

8. A composition according to claim 7 wherein (2) is 2,2'-dihydroxy-4-methoxybenzophenone.

9. A composition according to claim 7 wherein (2) is 2-(2-hydroxy-5-octylphenyl)benzotriazole.

10. A process for stabilizing a polyurethane from the deteriorative effects of ultraviolet light and nitrogen oxides, said polyurethane being the reaction product of a polyether, a polyester or a polyformal polyol, an aromatic diisocyanate and a low molecular weight compound containing two active hydrogen atoms according to the Zerewitinoff test which comprises adding a stabilizing amount of a composition comprising (1) an aminoplast resin, (2) an ultraviolet light absorber comprising a 2-hydroxybenzophenone, a benzotriazole or a benzylidene-malonic ester and (3) a phenolic antioxidant to said polyurethane.

11. The process according to claim 10 wherein the polyol and the diisocyanate are reacted and the resulting polymer is emulsified and the aminoplast resin is added to the emulsion.

12. The process according to claim 10 wherein the amount of aminoplast resin is from 0.1 to 5 percent by weight of the solids of the emulsion.

* * * * *